United States Patent
Lenio (10) Patent No.: US 10,648,591 B1
(45) Date of Patent: May 12, 2020

(54) MARINE CABLE BELLOWS INSTALLATION TOOL

(71) Applicant: John Lenio, Tiny (CA)

(72) Inventor: John Lenio, Tiny (CA)

( * ) Notice: Subject to any disclaimer, the term of this patent is extended or adjusted under 35 U.S.C. 154(b) by 121 days.

(21) Appl. No.: 16/114,306

(22) Filed: Aug. 28, 2018

(51) Int. Cl.
| | |
|---|---|
| *H02G 1/00* | (2006.01) |
| *F16L 3/015* | (2006.01) |
| *H02G 3/04* | (2006.01) |
| *F16L 3/26* | (2006.01) |

(52) U.S. Cl.
CPC ............. *F16L 3/015* (2013.01); *F16L 3/26* (2013.01); *H02G 3/0475* (2013.01)

(58) Field of Classification Search
CPC ........... H02G 3/00; H02G 1/00; H02G 3/0475
See application file for complete search history.

(56) References Cited

U.S. PATENT DOCUMENTS

| | | | | |
|---|---|---|---|---|
| 4,068,364 A | | 1/1978 | Tharp | |
| 4,291,454 A | | 9/1981 | Sawaryn | |
| 4,506,430 A | | 3/1985 | Guzay, Jr. | |
| D285,526 S | | 9/1986 | Ribakusky | |
| 5,109,739 A | * | 5/1992 | Hull | B25B 19/00 29/254 |
| 5,875,534 A | * | 3/1999 | Jackson | B25B 27/02 29/255 |
| 5,890,271 A | * | 4/1999 | Bromley | B25B 27/0028 29/255 |
| 6,049,960 A | | 4/2000 | Pilling | |
| 6,308,934 B1 | * | 10/2001 | Gallo | B25C 11/00 254/21 |
| 7,930,809 B2 | | 4/2011 | Huang | |
| 2004/0177485 A1 | | 9/2004 | Lihod | |
| 2006/0137160 A1 | | 6/2006 | Chung | |

FOREIGN PATENT DOCUMENTS

WO           2003018265        3/2004

* cited by examiner

*Primary Examiner* — Lee D Wilson
(74) *Attorney, Agent, or Firm* — Kyle A. Fletcher, Esq.

(57) ABSTRACT

The marine cable bellows installation tool is a hand tool. The marine cable bellows installation tool is configured for use in inserting a control cable through a cable bellow. The marine cable bellows installation tool inserts the control cable through the cable bellow such that the control cable will not damage the cable bellow during the process. The marine cable bellows installation tool comprises a tapered tube, a chase tube, and a striking tool. The tapered tube inserts into the cable bellow such that the tapered tube forms a barrier that protects the tapered tube from damage by the control cable. The striking tool is a momentum transfer device that provides the motive forces required to draw the control cable through the cable bellow. The chase tube is an intermediary that protects the cable bellow from any potential impact damage commonly associated with percussive procedures.

20 Claims, 5 Drawing Sheets

MARINE CABLE BELLOWS INSTALLATION TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of engineering in general including supports for pipes and cables, more specifically, a tool for guiding a cable through a supple guiding element. (F16L3/015)

An outdrive motor-driven vessel often requires that a control cable 142 be routed through the transom of the vessel. To maintain a watertight hull, the control cable 142 is typically routed through a cable bellow 141. The cable bellow 141 is an elastomeric structure that conducts the control cable 142 through the transom while forming a watertight seal that protects the integrity of the hull.

The traditional control cable 142 comprises a braided cable 161, a cable housing 162, a cable end 163, and a cable nut 164. The braided cable 161 is a cord structure formed from braided metal wires. The cable housing 162 is a hollow cylindrical structure. The nut is a threaded connection that attaches the hollow cylindrical structure to the outdrive motor. The braided cable 161 inserts into the cable housing 162 through the cable nut 164. The cable end 163 is an end piece that attaches to the end of the cylindrical structure that is distal from the cable nut 164. The cable end 163 protects the end of the braided cable 161 as it is attached to the control mechanisms of the outdrive motor.

The cable bellow 141 is a semi-rigid structure with an elastic nature. The control cable 141 inserts through the cable bellow 142 such that the cable bellow 142 seals the routing aperture for the control cable 141.

The cable bellow 141 acts as a spring. Specifically, when the control cable 142 inserts into the cable bellow 141, the pressing of the control cable 142 against the cable bellow 141 applies a force that displaces the cable bellow 141 in a direction that is perpendicular to the center axis of the cable bellow 141. The elasticity of the cable bellow 141 creates a force that opposes the displacement created by the insertion of the control cable 142 into the cable bellow 141. This opposing force is in a direction that returns the cable bellow 141 to its relaxed shape. Because the control cable 142 prevents the cable bellow 141 from returning completely to its relaxed shape, the cable bellow 141 applies a force against the control cable 142 that holds the cable bellow 141 in position against the control cable 142

The cable bellow 141 comprises a bellow lumen 151. The cable bellow 141 is further defined with a bellow lumen 151, a bellow base 152, and a bellow apex 153. The bellow lumen 151 is a negative space that forms the hollow interior of the cable bellow 141. The shape of the bellow lumen 151 is geometrically similar to the shape of the cable bellow 141. The bellow base 152 is an open aperture into the cable bellow 141. The bellow apex 153 is an open aperture into the cable bellow 141. The control cable 142 exits the cable bellow 141 through the bellow apex 153.

The insertion of the control cable 142 through the cable bellow 141 is often problematic. In order to maintain a watertight seal, the cable bellow 141 must fit the control cable 142 tightly. However, the tight fit control cable 142 in the cable bellow 141 means that the cable bellow 141 is prone to tearing when the edges of the cable end 163, the cable housing 162, and the cable nut 164 rub against the interior surface of the cable bellow 141. In addition, abrasion from the braided structure of the control cable 142 can further damage the cable bellow 141 during installation.

It is the observation of the applicant (who has considerable experience in maintaining outdrive motor-driven vessels) that inserting a control cable 142 through a cable bellow 141 is a frustrating, time consuming, wasteful, and expensive process. Clearly, an improved method to install a control cable 142 through a cable bellow 141 would be of benefit to the transportation industries.

SUMMARY OF INVENTION

This disclosure addresses the issues created by inserting a control cable through a cable bellow.

The marine cable bellows installation tool is a hand tool. The marine cable bellows installation tool is configured for use with a control cable through a cable bellow. The marine cable bellows installation tool inserts the control cable through the cable bellow such that the control cable will not damage the cable bellow during the process. The marine cable bellows installation tool comprises a tapered tube, a chase tube, and a striking tool. The tapered tube inserts into the cable bellow such that the tapered tube forms a barrier that protects the tapered tube from damage by the control cable. The striking tool is a momentum transfer device that provides the motive forces required to draw the control cable through the cable bellow. The chase tube is an intermediary that protects the cable bellow from any potential impact damage commonly associated with percussive procedures.

These together with additional objects, features and advantages of the marine cable bellows installation tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the marine cable bellows installation tool in detail, it is to be understood that the marine cable bellows installation tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the marine cable bellows installation tool.

It is therefore important that the claims be regarded as including such equivalent construction insofar as they do not depart from the spirit and scope of the marine cable bellows installation tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
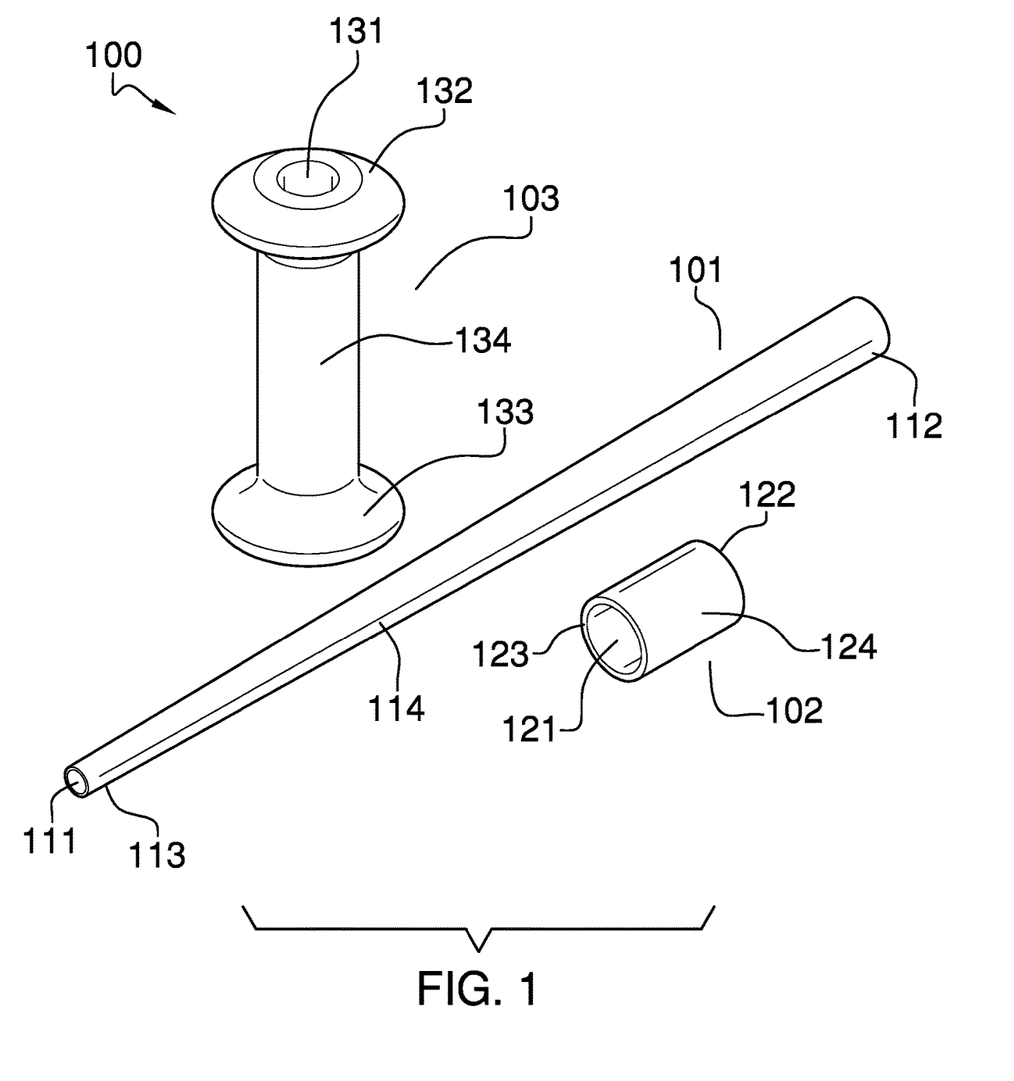
FIG. 1 is a perspective view of an embodiment of the disclosure.
Figure 2:
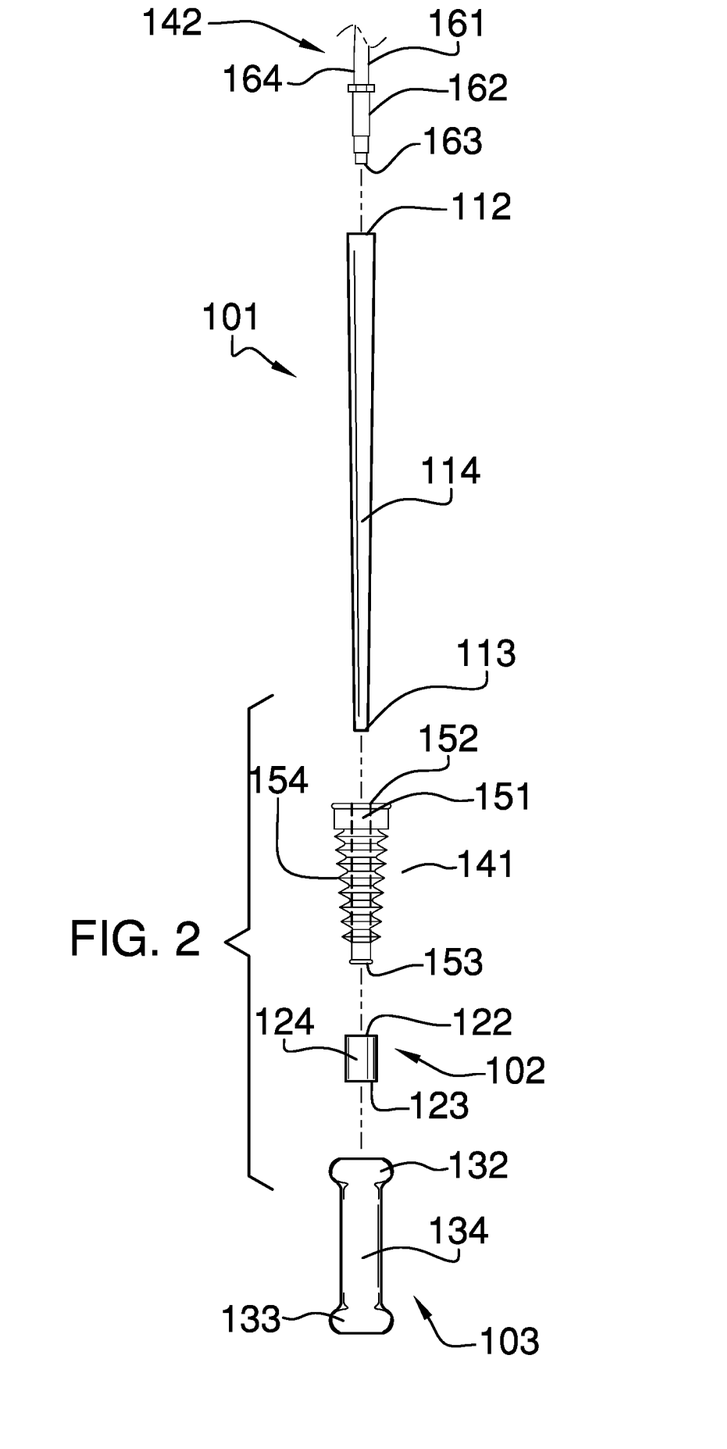
FIG. 2 is an exploded view of an embodiment of the disclosure.
Figure 3:
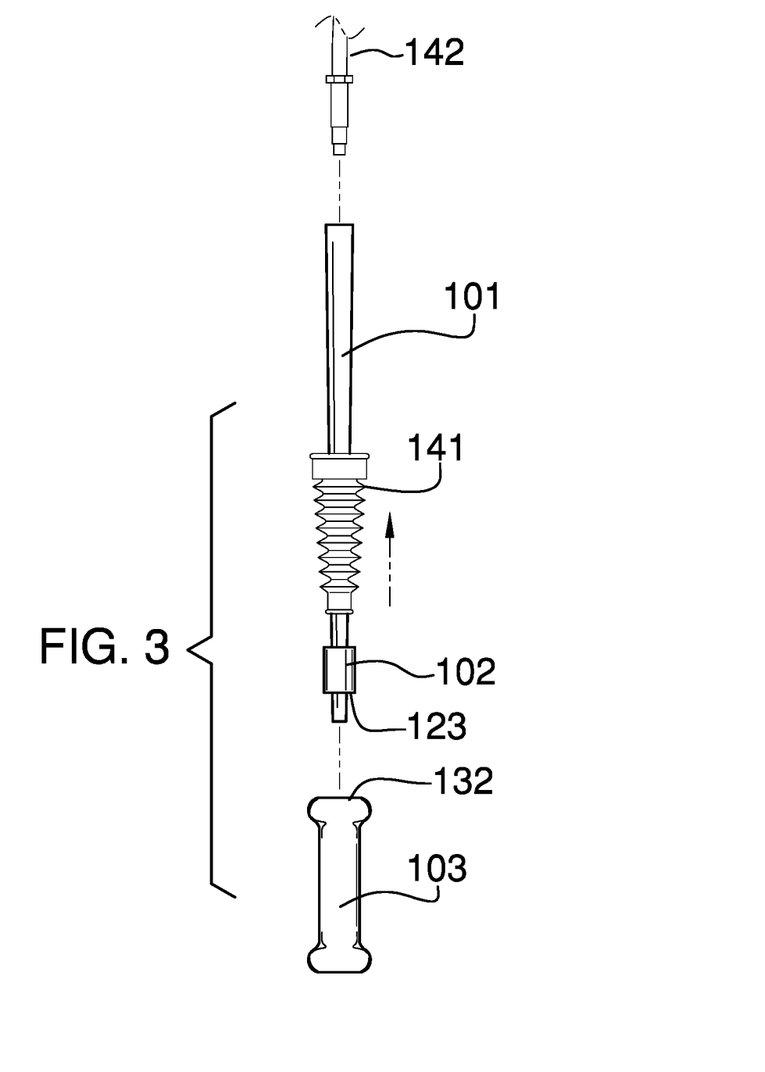
FIG. 3 is an in-use view of an embodiment of the disclosure.
Figure 4:
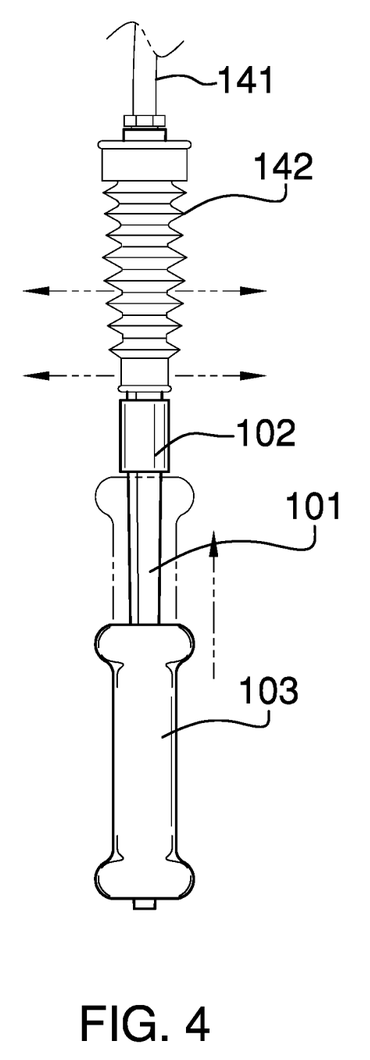
FIG. 4 is an in-use view of an embodiment of the disclosure.
Figure 5:
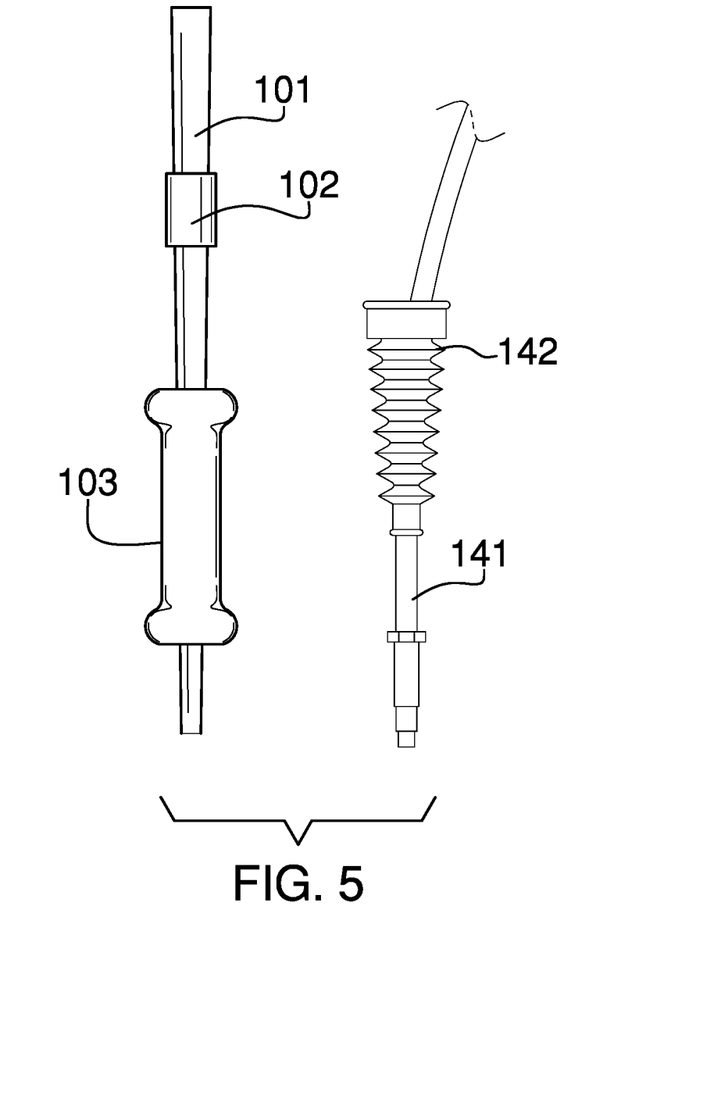
FIG. 5 is an in-use view of an embodiment of the disclosure.

Detailed reference will now be made to one or more potential embodiments of the disclosure, which are illustrated in FIGS. 1 through 5.

The marine cable bellows installation tool 100 (hereinafter invention) is a hand tool. The invention 100 is configured for use with a control cable 142 and a cable bellow 141. The invention 100 inserts through the control cable 142 through the cable bellow 141 such that the control cable 142 will not damage the cable bellow 141 during the process. The invention 100 comprises a tapered tube 101, a chase tube 102, and a striking tool 103. The tapered tube 101 inserts into the cable bellow 141 such that the tapered tube 101 forms a barrier that protects the cable bellow 141 from damage by the control cable 142. The striking tool 103 is a momentum transfer device that provides the motive forces required to draw the control cable 142 through the cable bellow 141. The chase tube 102 is an intermediary that protects the cable bellow 141 from any potential impact damage commonly associated with percussive procedures of the striking tool 141.

In the first potential embodiment of the disclosure, the invention 100 was configured for use with a Mercury Bravo One X® outdrive motor, a Mercury Bravo Two X® outdrive motor, and a Mercury Bravo Three X® outdrive motor. In the first potential embodiment of the disclosure, the cable bellow 141 and the bellow lumen 151 have the rough shape of a truncated pyramid. The bellow base 152 is the base of the truncated pyramid that forms the cable bellow 141. The bellow apex 153 is the truncated apex of the truncated pyramid that forms the cable bellow 141. The bellow lateral face 154 is the lateral face of the truncated pyramid that forms the cable bellow 141. The bellow lateral face 154 forms the walls of the channel that guides the tapered tube 101 through the bellow lumen 151.

The tapered tube 101 is a sacrificial structure such that the tapered tube 101 will become damaged before the control cable 142 will be able to damage the cable bellow 141. The tapered tube 101 forms a protective structure between the control cable 142 and the cable bellow 141 as the control cable 142 inserts through the tapered tube 101. The modulus of the tapered tube 101 is greater than the modulus of the cable bellow 141 such that deformation forces generated by the control cable 142 are distributed over a greater surface area of the bellow lumen 151 than would be the case if the tapered tube 101 was not used.

The tapered tube 101 is a hollow semi-rigid structure. The tapered tube 101 has an elastic nature. The tapered tube 101 has the shape of a truncated pyramid. In the first potential embodiment of the disclosure, the tapered tube 101 has the shape of a truncated cone. The tapered tube 101 is formed from a sheeting. The tapered tube 101 comprises a tube lumen 111. The tapered tube 101 is further defined with a tube base 112, a tube apex 113, and a tube lateral face 114. The tube apex 113 of the tapered tube 101 inserts into the bellow lumen 151 of the cable bellow 141. The tapered tube 101 inserts into the bellow lumen 151 through the bellow base 152 of the cable bellow 141.

The tube lumen 111 is a negative space that forms the hollow interior of the tapered tube 101. The shape of the tube lumen 111 is geometrically similar to the shape of the tapered tube 101. In the first potential embodiment of the disclosure, the tube lumen 111 has a truncated cone shape. The control cable 142 travels through the channel formed by the tube lumen 111. The tapered tube 101 enters the cable bellow 141 through the bellow base 152.

The tube base 112 is the base of the truncated pyramid that forms the tube lumen 111. The tube base 112 is an open aperture into the tube lumen 111. The control cable 142 enters the tube lumen 111 through the tube base 112. The tube apex 113 is the truncated apex of the truncated pyramid that forms the tube lumen 111. The tube apex 113 is an open aperture into the tube lumen 111. The control cable 142 exits the tube lumen 111 through the tube apex 113.

The tube lateral face 114 is the lateral face of the truncated pyramid that forms the tube lumen 111. The tube lateral face 114 forms the walls of the channel that guides the control cable 142 through the tube lumen 111. The tube lateral face 114 is formed from an elastomeric material such that the tube lateral face 114 is deformed by the control cable 142 as the control cable 142 travels through the tube lumen 111.

The chase tube 102 is a sacrificial structure such that the chase tube 102 will become damaged before the striking tool 103 will be able to damage the cable bellow 141. The chase tube 102 forms an intermediary structure between the striking tool 103 and the cable bellow 141. The chase tube 102 transfers the impact of the momentum exchange between the striking tool 103 and the cable bellow 141. The modulus of the chase tube 102 is selected such that the chase tube 102 diffuses the impact from the momentum exchange such that the striking tool 103 is less likely to damage the cable bellow 141 than would be the case if the chase tube 102 was not used.

The chase tube 102 is a hollow semi-rigid structure. The chase tube 102 has an elastic nature. The chase tube 102 has the shape of a prism. In the first potential embodiment of the disclosure, the chase tube 102 has the shape of a cylinder. The chase tube 102 comprises a chase lumen 121. The chase tube 102 is further defined with a guide end 122, a working end 123, and a chase lateral face 124. The bellow apex 153 of the cable bellow 141 inserts into the guide end 122 of the chase tube 102.

The chase lumen 121 is a negative space that forms the hollow interior of the chase tube 102. The shape of the chase lumen 121 is geometrically similar to the shape of the chase tube 102. In the first potential embodiment of the disclosure, the chase lumen 121 has a cylindrical shape. The bellow apex 153 of the cable bellow 141 inserts into the channel formed by the chase lumen 121.

The guide end 122 is a first end of the prism that forms the chase lumen 121. The guide end 122 is an open aperture into the chase lumen 121. The working end 123 is a second end of the prism that forms the chase lumen 121. The working end 123 is an open aperture into the chase lumen 121. The working end 123 is the end of the chase lumen 121 that is struck by the striking tool 103. The control cable 142 enters the chase lumen 121 through the bellow apex 153 of the cable bellow 141. The control cable 142 exits the chase lumen 121 through the working end 123.

The chase lateral face 124 is the lateral face of the cylinder that forms the chase lumen 121. The chase lateral face 124 forms the walls of the channel that guides the control cable 142 and the cable bellow 141 through the chase lumen 121.

The striking tool 103 has the shape of a composite prism. In the first potential embodiment of the disclosure, the striking tool 103 has the shape of a cylinder with identical disks formed on both the primary striking face 132 and the supplemental striking face 133 of the chase tube 102. Each of the identical disks of the striking tool 103 increase the contact area of the striking tool 103 such that the pressure generated by the impact of the striking tool 103 during the momentum exchange is reduced. The striking tool 103 is hit against the working end 123 of the chase tube 102 such that the cable bellow 141 is driven along the length of the control cable 142.

The striking tool 103 is a hollow rigid structure. The striking tool 103 comprises a striking lumen 131. The striking tool 103 is further defined with a primary striking face 132, a supplemental striking face 133, and a striking lateral face 134. Once the control cable 142 extends through the bellow apex 153 of the cable bellow 141, the control cable 142 inserts into the striking lumen 131 of the striking tool 103. The striking tool 103 is configured such that an applied tension on the control cable 142 can guide the trajectory of the striking tool 103.

The striking lumen 131 is a negative space that forms the hollow interior of the striking tool 103. The shape of the striking lumen 131 is geometrically similar to the shape of the striking tool 103. In the first potential embodiment of the disclosure, the striking lumen 131 has a cylindrical shape.

The primary striking face 132 is a disk-shaped structure formed on a first end of the prism structure of the striking tool 103. The primary striking face 132 is an open aperture into the striking lumen 131. The primary striking face 132 of the striking lumen 131 receives the control cable 142 from the working end 123 of the striking lumen 131. The primary striking face 132 is the end of the striking lumen 131 that strikes the working end 123 of the chase tube 102. The primary striking face 132 receives the control cable 142 such that the working end 123 can continue to strike the striking tool 103 of the chase tube 102 until the control cable 142 is fully inserted through the cable bellow 141.

The supplemental striking face 133 is a disk-shaped structure formed on a first end of the prism structure of the striking tool 103. The supplemental striking face 133 is an open aperture into the striking lumen 131. The supplemental striking face 133 of the striking lumen 131 discharges the control cable 142 from the striking tool 103. The supplemental striking face 133 is the end of the striking lumen 131 that is distal from the primary striking face 132. The supplemental striking face 133 is identical to the primary striking face 132 such that the supplemental striking face 133 and the primary striking face 132 are interchangeable. The control cable 142 exits the striking tool 103 through the supplemental striking face 133.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bellow: As used in this disclosure, bellow refers to a gasket used to seal an aperture formed through the transom of a vessel.

Bellows: As used in this disclosure, a bellows refers to a hollow mechanical structure designed such that the interior volume of the hollow mechanical structure will change as the bellows performs its function.

Cable: As used in this disclosure, a cable is a cord formed from braided metal wires.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder, prism, or a pyramid. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prisms or pyramidal structures share the same line, they are said to be aligned. When the center axes of two cylinder, prism or pyramidal structures do not share the same line they are said to be offset.

Channel: As used in this disclosure, a channel is a tubular passage through which an object or fluid is passed through.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Conduit: As used in this disclosure, a conduit is a flexible tube, pipe or hose that is used to route, enclose, and protect electrical cables.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance.

Duration: As used in this disclosure, duration refers to the measure of the passage of time between two or more events.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Gasket: As used in this disclosure, a gasket is an elastomeric material that is placed between a first surface and a second surface for the purpose of: 1) creating a liquid or gas impermeable seal between the first surface and the second surface; or, 2) preventing the first surface from damaging the second surface (or vice versa).

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Hand Tool: As used in this disclosure, a hand tool refers to a tool that is small and light enough to allow a person to hold the tool during use.

Impact: As used in this disclosure, an impact refers to an exchange of momentum between two objects over a duration. An impact often refers to a collision between two objects.

Lumen: As used in this disclosure, a lumen refers to the hollow channel within a hose, tube, or pipe through which fluid is transported.

Modulus: As used in this disclosure, the modulus of an elastic textile or elastic sheeting is a function that describes the percentage change in the span of the elastic textile or elastic sheeting as a function of the force applied to the elastic textile or elastic sheeting. When comparing modulus, a larger modulus is taken to imply that an increase in force is required to get the same percentage change in the elastic textile or elastic sheeting.

Negative Space: As used in this disclosure, negative space is a method of defining an object through the use of open or empty space as the definition of the object itself, or, through the use of open or empty space to describe the boundaries of an object.

N-gon: As used in this disclosure, an N-gon is a regular polygon with N sides wherein N is a positive integer number greater than 2.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force.

Sacrificial Structure: As used in this disclosure, a sacrificial structure is a first object or structure that protects a second object or structure from damage. More specifically, the sacrificial structure protects the second object or structure by being damaged instead of the second object or structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Stern: As used in this disclosure, the stern refers to the aft or posterior side of a vehicle or vessel.

Striking Tool: As used in this disclosure, a striking tool is a tool that exchanges momentum in a controlled manner between two objects through an impact. A hammer is an example of a striking tool.

Tool: As used in this disclosure, a tool is a device, an apparatus, or an instrument that is used to carry out an activity, operation, or procedure.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Transom: As used in this disclosure, a transom refers to a horizontal exterior surface of a vessel that is above the waterline. The term transom is often used more specifically to refer to the stern of the vessel.

Truncated: As used in this disclosure, a geometric object is truncated when an apex, vertex, or end is cut off by a line or plane.

Truncated Cone: As used in this disclosure, a truncated cone is a frustum that remains when the apex of a cone is truncated by a plane that is parallel to the base of the cone. See Bung.

Truncated Pyramid: As used in this disclosure, a truncated pyramid is a frustum that remains when the apex of a pyramid is truncated by a plane that is parallel to the base of the pyramid.

Vehicle: As used in this disclosure, a vehicle is a motorized device used for transporting passengers, goods, or equipment. The term motorized vehicle refers to a vehicle can move under power provided by an electric motor or an internal combustion engine.

Vessel: As used in this disclosure, a vessel is a type of vehicle. A vessel transports passengers, goods, or equipment over water.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A line installation tool comprising:
a tapered tube, a chase tube, and a striking tool;
wherein the tapered tube is a sacrificial structure;
wherein the chase tube is a sacrificial structure;
wherein the line installation tool is a hand tool;
wherein the line installation tool is configured for use with a control cable and a cable bellow;
wherein the line installation tool inserts the control cable through the cable bellow;
wherein the tapered tube inserts into the cable bellow such that the tapered tube forms a barrier between the cable bellow and the control cable;
wherein the striking tool is a momentum transfer device;
wherein the striking tool draws the control cable through the cable bellow;
wherein the chase tube is an intermediary between the cable bellow and the striking tube;
wherein the cable bellow is further defined with a bellow lumen, a bellow base, a bellow apex and a bellow lateral face.

2. The line installation tool according to claim 1 wherein the modulus of the tapered tube is greater than the modulus of the cable bellow.

3. The line installation tool according to claim 2
wherein the tapered tube is a hollow semi-rigid structure;
wherein the tapered tube has an elastic nature.

4. The line installation tool according to claim 3
wherein the tapered tube has the shape of a truncated pyramid;
wherein the tapered tube is formed from a sheeting;
wherein the tapered tube comprises a tube lumen;
wherein the tube lumen is a negative space that forms the hollow interior of the tapered tube;
wherein the tapered tube is further defined with a tube base, a tube apex, and a tube lateral face.

5. The line installation tool according to claim 4 wherein the tube apex of the tapered tube inserts into the bellow lumen through the bellow base of the cable bellow.

6. The line installation tool according to claim 5 wherein the tube lumen is geometrically similar to the shape of the tapered tube.

7. The line installation tool according to claim 6
wherein the tapered tube enters the cable bellow through the bellow base;
wherein the control cable travels through the channel formed by the tube lumen.

8. The line installation tool according to claim 7
wherein the tube base is an open aperture into the tube lumen;
wherein the tube apex is an open aperture into the tube lumen;
wherein the control cable enters the tube lumen through the tube base;
wherein the control cable exits the tube lumen through the tube apex.

9. The line installation tool according to claim 8
wherein the tube lateral face is formed from an elastomeric material;
wherein the tube lateral face is deformed by the control cable as the control cable travels through the tube lumen.

10. The line installation tool according to claim 9
wherein the chase tube forms an intermediary structure between the striking tool and the cable bellow;
wherein the chase tube transfers the impact of the momentum exchange between the striking tool and the cable bellow.

11. The line installation tool according to claim 10
wherein the chase tube is a hollow semi-rigid structure;
wherein the chase tube has an elastic nature;
wherein the chase tube has the shape of a prism;

wherein the chase tube is further defined with a guide end, a working end, and a chase lateral face.

12. The line installation tool according to claim 10
wherein the chase tube comprises a chase lumen;
wherein the chase lumen is a negative space that forms the hollow interior of the chase tube.

13. The line installation tool according to claim 12
wherein the bellow apex of the cable bellow inserts into the channel formed by the chase lumen;
wherein the bellow apex of the cable bellow inserts into the guide end of the chase tube.

14. The line installation tool according to claim 13 wherein the shape of the chase lumen is geometrically similar to the shape of the chase tube.

15. The line installation tool according to claim 14
wherein the guide end is an open aperture into the chase lumen;
wherein the working end is an open aperture into the chase lumen;
wherein the working end is the end of the chase lumen that is struck by the striking tool;
wherein the control cable enters the chase lumen through the bellow apex of the cable bellow;
wherein the control cable exits the chase lumen through the working end.

16. The line installation tool according to claim 15
wherein the striking tool has the shape of a composite prism;
wherein the striking tool is a hollow rigid structure;
wherein the striking tool comprises a striking lumen;
wherein the striking tool is further defined with a primary striking face, a supplemental striking face, and a striking lateral face.

17. The line installation tool according to claim 16
wherein the striking lumen is a negative space that forms the hollow interior of the striking tool;
wherein the control cable inserts into the striking lumen of the striking tool;
wherein the shape of the striking lumen is geometrically similar to the shape of the striking tool;
wherein the primary striking face is a disk-shaped structure formed on a first end of the prism structure of the striking tool;
wherein the supplemental striking face is a disk-shaped structure formed on a first end of the prism structure of the striking tool;
wherein the primary striking face is the end of the striking lumen that strikes the working end of the chase tube.

18. The line installation tool according to claim 17
wherein the primary striking face is an open aperture into the striking lumen;
wherein the supplemental striking face is an open aperture into the striking lumen;
wherein the primary striking face of the striking lumen receives the control cable from the working end of the striking lumen;
wherein the primary striking face receives the control cable such that the working end can continue to strike the striking tool of the chase tube until the control cable is fully inserted through the cable bellow;
wherein the supplemental striking face is the end of the striking lumen that is distal from the primary striking face;
wherein the supplemental striking face is identical to the primary striking face such that the supplemental striking face and the primary striking face are interchangeable;
wherein the control cable exits the striking tool through the supplemental striking face.

19. The line installation tool according to claim 18
wherein the tapered tube has the shape of a truncated cone;
wherein the chase tube has the shape of a cylinder;
wherein the tube lumen has a truncated cone shape;
wherein the chase lumen has a cylindrical shape;
wherein the striking lumen has a cylindrical shape.

20. The line installation tool according to claim 19 wherein the control cable and the cable bellow are configured for use with an outdrive motor.

* * * * *